United States Patent
Gardiner

(10) Patent No.: US 6,195,099 B1
(45) Date of Patent: Feb. 27, 2001

(54) METHOD FOR TIME BASED SHADOW RENDERING

(75) Inventor: Harold Dee Gardiner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/204,887

(22) Filed: Dec. 3, 1998

(51) Int. Cl.[7] .................................................. G06F 15/00
(52) U.S. Cl. ............................................................ 345/426
(58) Field of Search ................................... 345/418, 419, 345/426, 425, 427, 114, 117, 118

(56) References Cited

U.S. PATENT DOCUMENTS 6,124,808 * 9/2000 Budnovitch ...................... 340/932.2
6,124,922 * 9/2000 Sentoku ................................ 355/53
6,124,989 * 9/2000 Oode et al. ........................... 359/729

* cited by examiner

*Primary Examiner*—Phu K. Nguyen
(74) *Attorney, Agent, or Firm*—Thorpe, North & Western, LLP

(57) ABSTRACT

A method for rendering large-area time-based shadows. A first step is to pre-process a database of three dimensional constructs that define all primitives and attributes of the primitives in a three dimensional simulated environment. The pre-processing step determines the time relevant behavior of the shadows by calculating an angle at which the primitive is illuminated, and an angle at which illumination ceases. The second step is to process the database at run-time using the pre-processed database of three dimensional constructs and pre-calculated illumination and no-illumination angles.

33 Claims, 2 Drawing Sheets

METHOD FOR TIME BASED SHADOW RENDERING

BACKGROUND

1. The Field of the Invention

This invention relates generally to displaying realistic images on a graphical display. More specifically, the present invention relates to the rendering of realistic large-area shadows cast by displayed objects relative to the objects and a perceived light source to thereby provide greater realism or image enhancement to an image shown on a graphical display, where the shadows change over time.

2. The State of the Art

The state of the art in rendering realistic images of three dimensional simulated environments in real-time is currently a difficult and expensive task because of the large computational resources required. Nevertheless, three dimensional scene realism is often the goal of computer generated imagery for many reasons. Consequently, over the years, various techniques have been developed to improve overall image quality and realism. These techniques include such things as texturing, lighting, anti-aliasing, and visibility to thereby add to the realism. One of the more challenging aspects of scene rendering is that of shadows. Shadows add greatly to the believability of an image. Objects in scenes without shadows often appear to float in the air. Shadows help the observer to see the proper relationships between objects and terrain in the scene.

A variety of algorithms have been developed for rendering shadows, but they are all very costly in terms of computer resources. These techniques are often used when creating computer animated movies or TV commercials. However, they generally involve the rendering of each individual frame, then capturing the frames for playback at faster speeds. In other words, they are generally not affordable for applications requiring real-time rendering, such as simulation systems used for training. However, the advantages of computer simulated training have made the ability to render realistic three dimensional simulated environments of increasing importance because of the practical and cost effective applications of such technology.

There are many training scenarios that use computer generated imagery to enhance the training experience. For some applications, the addition of shadows would greatly improve the training effectiveness. The required accuracy of the shadows is dependent on the training application. For example, training astronauts to dock with an object in space requires extremely accurate and dynamic shadows. The astronaut uses the shadows to judge relative distance and position of a spacecraft and the object that is being approached. In contrast, shadows may be far less significant to a user when training an individual to drive a tank. In this particular application, the primary value of the shadows may be just the increased realism and the fact that objects sometimes appear to be floating above the terrain when no shadow is present. While these flaws are almost always distracting, they are usually not critical or masking life threatening situations. However, the importance of a realistic training experience should not be minimized.

Other applications absolutely require shadows that mimic real-world conditions. Furthermore, these shadows must be capable of changing over time as the simulated sun or moon moves in a simulated sky. For example, the military often requires pilots to fly a night mission while wearing night vision goggles. Under certain conditions, regions not directly lit by moonlight are difficult to see through the goggles. For example, buildings or small hills may be completely hidden from the pilot's view if they lie in the shadow of a nearby mountain. These obstacles represent a life threatening situation for the pilot. Further complicating the situation is the fact that the shadows may be entirely different when the pilot flies the same corridor a few hours later when returning from a mission. If the training device cannot render realistic shadows, the pilot will receive negative training and perhaps a false sense of security if those same simulated objects in shadow are visible in the simulation because of a failure to accurately render a real world environment or conditions that may alter someone's perception of that environment, such as the night vision goggles.

It is this last class of shadow, a time based rendering of the shadow, which is the primary focus of the improvements of the invention over the state of the art. For example, it would be an improvement over the state of the art to provide a relatively low-cost solution to time varying shadows. It would also be an improvement to provide a multitude of levels of resolution, allowing some aspects of time based shadow rendering to be easily applied by any computer image generator. Of course, at the highest level of resolution, special rendering hardware would be capable of implementing all aspects of the improvements.

A vast number of state of the art shadow rendering algorithms are currently in use for non-realtime applications. Most of these techniques are currently not tractable for realtime rendering that is required in realtime simulations. While some success has been achieved with multi-pass shadow rendering techniques, they incur severe performance penalties and scenario constraints. Furthermore, they also require special hardware which is only available on high-end graphics systems, thereby limiting application of the improvements.

Most training applications that require shadows currently use database modeling techniques. For example, a dark, semi-transparent polygon can be attached beneath a moving vehicle. As the vehicle moves around, the shadow polygon follows along, making the underlying ground appear darker. These shadows are not highly realistic, but they often provide sufficient realism for purposes of the training application. This approach also only works for relatively small objects within the scene. These approaches are not useful for creating large shadow regions such as those from nearby mountains or hillsides.

Therefore, it would be an advantage over the state of the art techniques for rendering shadows to render large shadows that are time dependent and will adjust position relative to dynamically moving sunlight or moonlight. Furthermore, the level of detail or resolution should be adjustable to the capabilities of the graphics rendering hardware that is available in a system.

OBJECTS AND SUMMARY OF THE INVENTION

It is an object of the present invention to provide a method for rendering large shadow areas that can cover a significant amount of terrain and a large number of objects within a graphically simulated three dimensional simulated environment.

It is another object to provide a method for rendering large shadow areas, where the method is scalable in proportion to the rendering power of the graphics hardware to thereby always render shadows in realtime.

It is another object to provide a method for rendering shadows that move in accordance with elapsed time and reflects movement of a simulated moving light source such as the sun or the moon.

It is another object to provide a method for rendering shadows using a cost effective system that does not require multiple passes through a rendering engine.

It is another object to provide a method for rendering shadows that does not require special case shadow polygons.

It is another object to provide a method for rendering a time based shadow penumbra.

It is another object to provide a method for rendering a time based shadow penumbra which is capable of sharpening or blurring the time based shadow penumbra relative to a distance between a light source and an object casting a shadow.

It is another object to provide a method for rendering large area shadows that can be extended to include three dimensional features that lie on or near the terrains, such as trees, buildings or vehicles.

The presently preferred embodiment of the present invention is a method for rendering large-area time-based shadows. A first step is to pre-process a database of three dimensional constructs that define all static objects and attributes of objects in a three dimensional simulated environment. The pre-processing step determines the time relevant behavior of the shadows. The second step is to process the database at run-time using the pre-processed database of three dimensional constructs and time based shadows. All dynamically moving objects in the scene must be treated completely in run-time.

In a first aspect of the invention, it provides a means for the shadows to change over time as the simulated light source changes position. Not only does application of this invention improve scene realism and believability, but it provides significantly higher training value for some applications—such as night vision goggle training.

In a second aspect of the invention, the system enables determination of the capabilities of the rendering hardware and software. With this information, the system can then use level of application (resolution) information that enables the simulation to run in real-time.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Before describing the preferred embodiment of the present invention, it is necessary to understand some of the underlying detail of the processes that will be described.

Figure 1:
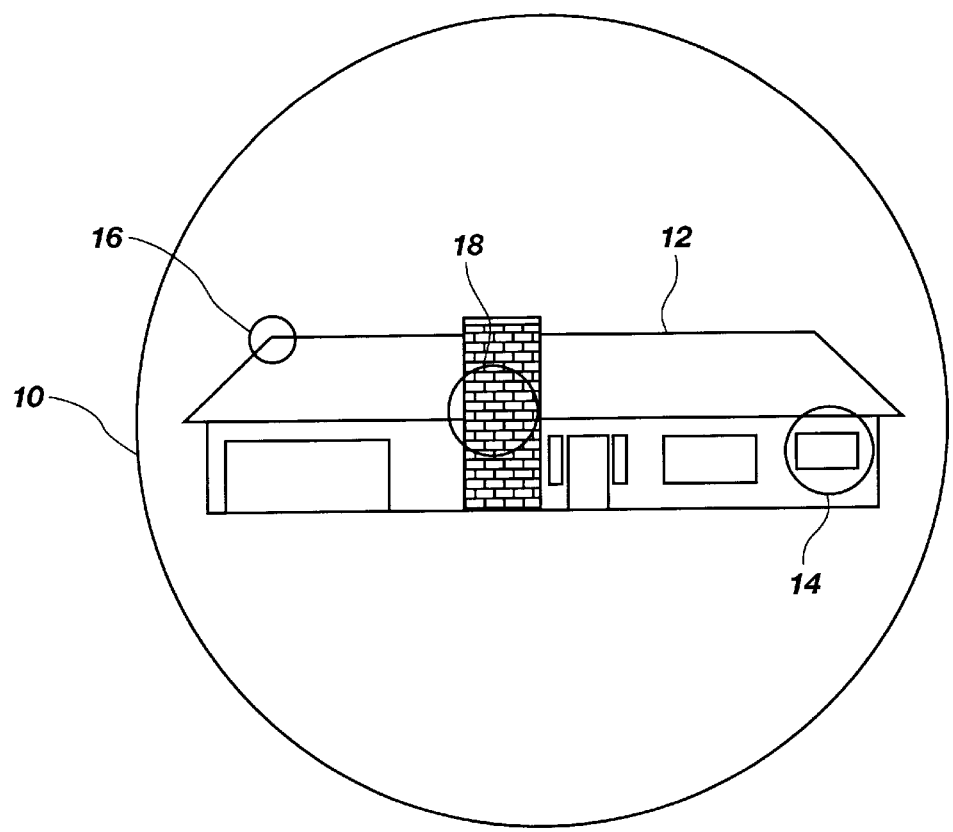
FIG. 1 is a profile view of examples of three dimensional constructs that are used to create objects within a three dimensional simulated environment.

FIG. 1 shows a database example consisting of several basic constructs in a three dimensional simulated environment. It should be noted that this invention is not limited to the constructs shown here, but these selected constructs are used for illustrative purposes only.

A first basic construct is an object 10. An object 10 is a collection of other primitives that are usually treated together. In this example in FIG. 1, the object 10 is represented as a house 12.

A second basic construct is a polygon 14. A polygon 14 is a basic surface type used in most computer graphics systems. It is defined as having three or more vertices, a surface color, and other surface characteristics. In the example shown in FIG. 1, the circled polygon 14 represents a window on the house 12.

A third basic construct is a vertex 16. A vertex 16 is a point that is defined as being at some location on a coordinate system within the three dimensional simulated environment saved in the database. Vertices are used to define positions within the coordinate system of database primitives. In the example shown in FIG. 1, the circled vertex 16 is one of the corners of the roof of the house 12.

A fourth basic construct is a texture 18. Textures are generally two dimensional patterns that are applied to a surface of a primitive, much like wallpaper. Textures typically provide the color and pattern detail for the surface, thereby providing substantially more detail than the polygon structure alone. As a helpful note, each color texture element within the pattern is referred to as a "texel".

Before providing the detailed description of the invention, it is also helpful to know more detailed background information regarding shadows. It takes at least two database primitives to create realistic shadows: one primitive that blocks light and casts a shadow, and a second primitive which has the shadow cast upon it. For example, the house 12 used in the above example could cast a shadow on the underlying ground, or, a nearby mountain could cast a shadow onto the house.

Similarly, two processes are required to render shadows with any computer graphics device. The first process is to determine where the shadow is cast (or projected). The second process is to determine what the shadow looks like.

In the presently preferred embodiment of the invention, the first process of determining where the shadow is cast will be computed as an off-line pre-process step (at least for static environments). The second step of determining what the shadow should look like is done as a run-time process, based on the current position of the simulated sun or moon.

Advantageously, the pre-process step is the most complex, and thus requires the greatest amount of compute power. This step is "advantageously" complex because it is completed before the run-time process that is critical for real-time simulated environments.

The complexity of the calculations performed depends heavily on the complexity of the database being pre-processed. Many applications of this invention can limit the scope of this pre-process step in order to keep the computations within acceptable time limits. For example, for a military night vision goggle training mission, the flight corridor of a simulated aircraft is often known ahead of time. Thus, the shadow calculations can be limited to portions of the database along the flight corridor. While this limits the ability of the system to stray from a predetermined flight path, shadow complexity can be a tradeoff. However, it is often the case that computer resources necessary to do the shadow calculation are available, and if the calculations can be done rapidly enough, the entire database can be processed. The user is best able to make this determination regarding what is most important for a particular application.

Figure 2:
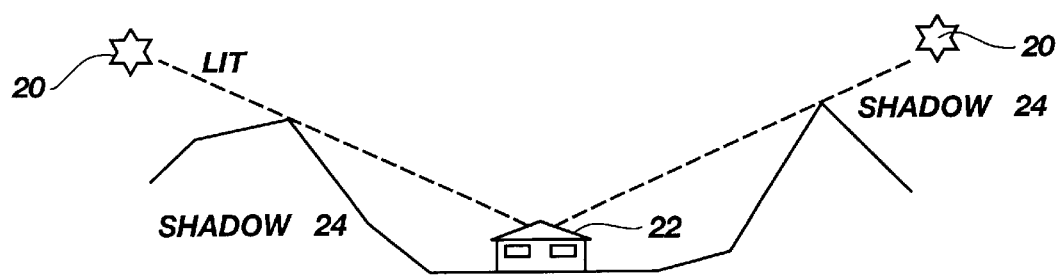
FIG. 2 is an example showing an example of limits of a shadow in the three dimensional simulated environment relative to the passage of time as a simulated sun (light source) moves over the three dimensional simulated environment.

FIG. 2 is used to help explain the basic process of the present invention. What is important to remember is that there are many different approaches to calculating the required information. The example provided is only one method.

Assume that the simulated sun 20 rises on the left side of the drawing and sets on the right side. For any given object in the database there will be a time (or angle) when the simulated sun 20 (or moon) begins to illuminate an object 22. This is the time when the object 22 comes out of shadow 24. The object 22 will then be lit until some later time when the simulated sun 20 (or moon) sets, thereby putting the object 22 back in shadow 24.

A couple of basic assumptions can be made to simplify this scenario show in FIG. 2. First, for any given day of the year there is a correlation between time of day and angle to the sun 20 or moon. Second, most objects will come out of shadow 24 once per day (for the sun or the moon, but not both) and return into shadow once per day. Thus, for each object, it is possible to calculate the angle at which the sun 20 or moon will first illuminate the object 22 (lit angle), and the angle at which the illumination stops (unlit angle). These two parameters are calculated and then stored for each object of interest in the database. The invention is not limited, however, to a single on-and-off time per object. Multiple light sources can illuminate objects, and the system can account for this possibility.

With this information calculated during the pre-process stage, the next step is the run-time stage. In this stage of the presently preferred method, the current angle of the sun or the moon is compared against the stored illumination angle and the non-illuminated angle of each object of interest in the three dimensional simulated environment defined by the database. The comparison will thus rapidly indicate whether the entity is in or out of shadow, and the entity can then be rendered accordingly. This method assumes, of course, that the rendering process provided by the rendering hardware and software supports the notion of illumination via light sources.

The object referred to represents any desired database construct. The appropriate constructs to use will depend on the computer resources available and the realism that is required in a resulting image of the three dimensional simulated environment.

For example, suppose that it is desired to perform these calculations at an object level. The house 20 in FIG. 2 will all be completely in or completely out of shadow 24. Consequently, at the appropriate time of day, the house 20 will suddenly become fully lit by the sun (or moon).

Similarly, at a later time, the entire house 20 will suddenly stop being lit. This level of realism may be perfectly acceptable if the training exercise requires the pilot to fly down the corridor at different times of the day. However, the limitation is that the pilot should not be in the area when the sun's angle is updated. Otherwise, the illusion of realism will be substantially impaired when the house 20 suddenly jumps into or out of a shadow.

However, if the rendering process is designed to provide more realistic and dynamic control of the lighting parameters, the object can be faded in or out of light as the position of the light source moves. Thus, rather than having the object "pop" in or out of shadow, it will smoothly fade in or out.

This object level (or resolution) of control may not, however, be adequate for all objects within the scene. For example, the terrain surface itself may not be broken into useful objects, at least with respect to shadows. Better results can be obtained by controlling such surfaces at a polygon level of resolution. Accordingly, a determination must be made for each polygon (or other primitive) within the object. This approach would allow portions of the house (or terrain) to be in shadow while other portions would be out of the shadow. Again, further improvements can be achieved by fading the primitive in and out of shadow, rather than popping in and out.

Even this primitive (polygon) level shadow control may not be sufficient for some applications that require even greater accuracy and modeling of real-world conditions. Further enhancement can be achieved by determining the status at each vertex of each polygon. Polygons lying completely inside or outside of shadow are easy to deal with. However, those polygons lying along the shadow's boundary will require further processing. If some of the vertices lie in the shadow while others lie outside the shadow, the polygon is clipped along a shadow boundary, thereby effectively forming two new polygons one in and one out of shadow. The clipping operation can be performed by using the current sun (or moon) angle in relation to the on/off angle at each vertex.

Alternately, if pixel rate shading algorithms are supported by the rendering hardware, similar techniques can be applied to the shadow calculations. Standard shading algorithms interpolate data defined at the vertices in order to obtain unique data at each pixel. These same algorithms can be used to interpolate the on/off time at each vertex in order to find the on/off time for each pixel. This will allow the shadow boundary to lie anywhere within the primitive without requiring the extra step of clipping. This boundary can then be softened (anti-aliased) by gradually fading the light on or off as the pixels get near the boundary.

Texture added to polygon surfaces generally provides surface detail far in excess of that provided by the polygon structure of the object. If the on and off angles are stored as part of the texture, they are used to determine the shadow status of every texel. Furthermore, standard texture filtering techniques (such as MIP$^4$ trilinear blending) can be used to compute the shadow status of every pixel on the screen. This not only provides shadow control at pixel resolution, but the texture filtering process can also be used to smooth, or soften, the shadow boundary. Therefore, instead of simply deciding if the pixel is in or out of shadow, the filter can determine what percentage of the pixel is in or out of shadow, and thereby provide appropriate partial illumination, or fading, along the shadows perimeter.

An important consideration of the method described above is that the particular level of detail selected by the user must be the same for both processing stages. In other words, if the pre-processing of the database is done at polygon resolution, the runtime decision making can not be done at pixel resolution, or vice versa.

It should be noted that using the angle to the light source has the added advantage of accurately accounting for shadow penumbra. The closer the shadow casting object is to the shadow receiving object, the sharper the penumbra. Conversely, a more distant object will cause a fuzzy penumbra.

Similarly, the same effect of sharpening or blurring the shadow penumbra can occur when the shadow being cast from an object is long or short. For example, if the simulated light source is the sun, and the sun is overhead, the shadow cast by the object will be relatively small and short, and therefore sharp. However, when the distance between shadow casting object and the sun is greater, the object will cast a large and longer shadow, and will therefore be blurred.

With appropriate hardware support and pre-processing algorithms, the present invention can generate extremely realistic looking shadows for large portions of a database. However, this approach does not readily lend itself to supporting dynamically moving objects within the database. While the present invention can be adapted to support this condition, it is very expensive from a computational perspective. This is because the first stage processing must all occur in real-time. However, if sufficient compute resources are available, real-time simulation can be achieved.

However, it should be apparent that the preferred embodiment of the present invention does allow the light source to move in real-time, as long as it follows the path used to pre-compute the on/off times. Accordingly, when using this approach with texture resolution or pixel rate interpolations, it is quite possible to see the light source move in time without distracting artifacts such as popping.

Figure 3:
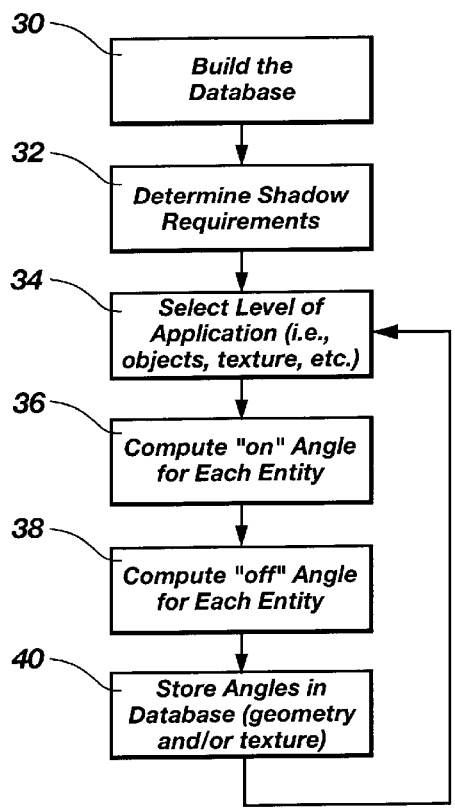
FIG. 3 is a first flow chart describing the steps of the presently preferred embodiment which are described in accordance with the principles of the present invention. These steps show the pre-processing stage of the invention on the three dimensional simulated environment database.

FIG. 3 is a flowchart which illustrates the processing steps that are executed for pre-processing. Rather than try and provide a robust, general-purpose solution for rendering shadows, the presently preferred embodiment of the invention focuses on a limited class of applications that have very specific needs for shadows. Thus, it is possible to do complex shadow projection calculations on a database as an off-line process, and then do simple comparisons at run-time to determine what is in and what is out of shadow based on the current position of the simulated light source, the sun or moon. It is important to remember from the outset that the pre-processing steps assume that the graphics system is already capable of rendering surfaces which are lit by one or more light sources.

It is also mentioned that the invention can be extended to include more complex cases such as moving objects or moving light sources (moving somewhere not on the pre-computed path), but the shadow projections must then be computed in run-time as well, thereby greatly increasing the computational load. It should also be noted that the invention is not limited to shadows caused by the sun or moon.

Turning now to the flowchart, step 30 requires that the database containing all objects within the three dimensional simulated environment is to be generated. Notice that no special restrictions apply as to the nature of the primitives within the database. It should only be remembered that if the environment is not static, computational resources must be high for real-time simulation.

Before doing all of the pre-process calculations, it is appropriate to understand the simulation accuracy requirements. Once this is understood, step 32 states that the user can determine at what level, or resolution, to apply the presently preferred embodiment. For example, the resolution may be selected from that of object, texture, polygon or pixel levels. The finer the resolution, the more calculations must be done by the system.

Step 34 requires that the "on" angle must now be calculated for each primitive. Specifically, the path of the simulated light source must have already been established. With this known path, the angle at which the simulated light source in the sky begins to illuminate the primitive is determined.

Step 36 requires that the "off" angle must now be calculated for each primitive. With the known path of the simulated light source, the angle at which the simulated light source in the sky stops illuminating the primitive is determined.

Finally, step 38 requires that the on and off angles calculated in steps 34 and 36 be stored with the database for recall during the run-time stage.

Steps 34, 36, and 38 are repeated for each primitive within the database, thus making it apparent why this step is so computationally demanding, and why it is advantageously accomplished before the run-time stage.

Before proceeding to the run-time stage of the invention, it should be mentioned that in some cases it is desirable to have selected more than one level of resolution in step 32. In other words, the pre-processing stage might make all calculations for on and off angles for all the primitives at two or three levels of resolution. With this information stored in the database, the run-time process can test the graphics rendering hardware and software of the system running the simulation. If the rendering hardware and software is capable enough, the highest level of resolution can be used in the run-time process. However, if the rendering hardware and software is found to be more limited, a lower resolution can be used. The user might be offered a choice, or the system can automatically select the highest level of resolution which still enables real-time simulation to occur.

Figure 4:
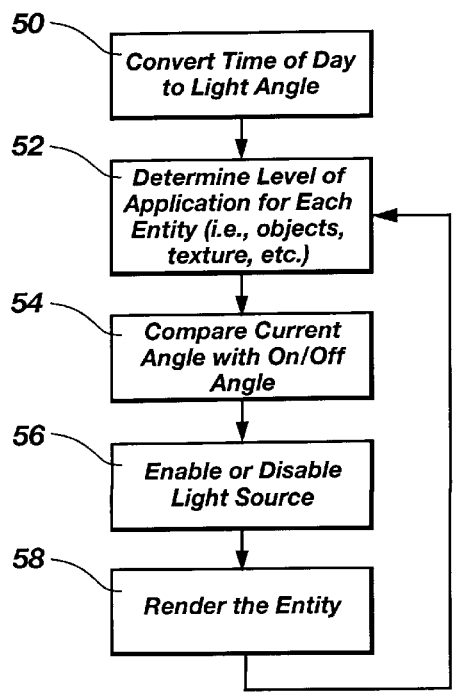
FIG. 4 is a second flow chart describing the steps of the presently preferred embodiment which are described in accordance with the principles of the present invention. These steps show the run-time processing stage of the invention.

FIG. 4 is a flowchart of the run-time stage of the presently preferred embodiment of the present invention. After the pre-processing stage calculations are complete, this stage enables real-time simulation.

Step 50 requires that the current time of day within the simulation must be known. For example, if a pilot is running a night attack simulation, the simulated light source will be the moon at a particular elevation in the sky. With this information, an angle of the simulated light source with respect to a horizontal plane is determined.

Step 52 requires that the system (or the user) select the level of resolution for each primitive within the database, so that the appropriate information can be accessed from the pre-processed database.

Step 54 requires that the system compare the angle determined in step 50 be compared with the on and off angles that have been previously calculated for each primitive.

Step 56 causes each primitive to either be illuminated by the simulated light source, or be in shadow in accordance with the comparison done in step 54.

Primitives along the shadow boundary may be partially illuminating, thereby simulating the shadow penumbra.

Step 58 requires that the primitive be rendered. At this point, the method returns to step 52 to begin the calculations again for each primitive at the selected level of resolution. Steps 52, 54, 56 and 58 are repeated for every primitive in the database for each frame that is rendered in a graphical display of the simulated environment. Typically, a minimum of at least 15 frames per second are necessary to achieve real-time simulation without distracting motion on the graphical display. Accordingly, the number of calculations can be very great.

It was mentioned previously that there is a correlation between time of day and the angle to the simulated light source. Obviously, simulations can be made very accurate. Consequently, other factors that can also affect the angle are the latitude of the simulated environment, and the time of year. It is matter of choice whether or not the realism of the simulation is sufficiently accurate to incorporate these other factors in the angle calculation.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for rendering of time based shadows in a three dimensional simulated environment, said method comprising the steps of:
    (1) generating a database consisting of a plurality of constructs that represent all objects within the three dimensional simulated environment;
    (2) pre-processing the database to thereby generate and store therein illumination data which represents when each of the plurality of constructs is illuminated and not illuminated by a simulated light source relative to a selected time base; and
    (3) processing the database at run-time using the illumination data to selectively illuminate or cease illumination of each of the plurality of constructs relative to the selected time base and a position of the simulated light source, and thereby render at least one time based shadow, wherein the three dimensional simulated environment is displayed using graphics rendering hardware.

2. The method as defined in claim 1 wherein the step of pre-processing the database further comprises the steps of:
    (1) selecting a level of application for the plurality of constructs, wherein the level of application defines a resolution for projecting at least one time based shadow, such that the at least one time based shadow is applied to the plurality of constructs at the selected shadow resolution;
    (2) calculating a first angle above a horizontal plane above which the simulated light source will illuminate a selected one of the plurality of constructs;
    (3) calculating a second angle above a horizontal plane below which the simulated light source will cease to illuminate the selected one of the plurality of constructs;
    (4) storing the first and the second angle determined in steps (2) and (3) for the selected one of the plurality of constructs at the selected shading resolution in the database; and
    (5) repeating steps (2), (3) and (4) for each of the plurality of constructs in the database.

3. The method as defined in claim 2 wherein the method further comprises the step of selecting the level of application from the group of constructs consisting of objects, textures, texels, vertices and polygons.

4. The method as defined in claim 3 wherein the method further comprises the step of rendering more realistic shadows by causing an object that transitions between an illuminated state and a non-illuminated state to gradually change therebetween as a function of the selected time base.

5. The method as defined in claim 3 wherein the method further comprises the step of determining an illumination status at each vertex of each polygon of the plurality of constructs, such that polygons that should be partially illuminated are shadowed accordingly.

6. The method as defined in claim 5 wherein the method further comprises the step of clipping a polygon that is partially illuminated, wherein the polygon is divided into an illuminated polygon and a non-illuminated polygon.

7. The method as defined in claim 5 where in the method further comprises the step of utilizing a pixel rate shading process to thereby interpolate the first angle and the second angle at each vertex of a polygon that is partially illuminated, to thereby determine the first angle and the second angle for each pixel within the partially illuminated polygon.

8. The method as defined in claim 7 wherein the method further comprises the step of partially illuminating each pixel that is determined to be near an illumination boundary of the partially illuminated polygon, so that the illumination boundary can be anti-aliased to thereby soften an image thereof.

9. The method as defined in claim 3 wherein the method further comprises the step of storing the first angle and the second angle as an element of a texture of each polygon, to thereby determine an illumination status of each texel within the polygon.

10. The method as defined in claim 9 wherein the method further comprises the steps of:
    (1) determining an illumination status of each texel within the polygon by using a standard texture filtering process; and
    (2) determining what percentage of each pixel is illuminated.

11. The method as defined in claim 2 wherein the method further comprises the step of generating the three dimensional simulated environment such that the plurality of constructs are statically positioned therein, and the only moving objects are the simulated light source, the time based shadows, and a perspective view representing a user moving within the three dimensional simulated environment.

12. The method as defined in claim 2 wherein the method further comprises the step of generating the three dimensional simulated environment such that the plurality of constructs are dynamically positioned therein such that any of the plurality of constructs is capable of movement, thereby requiring a graphics engine to recalculate the first angle and the second angle for each moving one of the plurality of constructs during run-time operation of the simulation.

13. The method as defined in claim 2 wherein the method further comprises the step of limiting the level of application for the plurality of constructs in accordance with a perceived computational limit of the graphics rendering hardware.

14. The method as defined in claim 2 wherein the method further comprises the step of limiting the level of application for the plurality of constructs along a selected path of selectable width within the three dimensional simulated environment to thereby control a size and complexity of the illumination data stored in the database.

15. The method as defined in claim 2 wherein the method further comprises the step of enabling a plurality of light sources to illuminate the plurality of constructs, wherein an array of first angles and an array of second angles is generated from the plurality of light sources.

16. The method as defined in claim 15 wherein the method further comprises the steps of:
(1) selecting a plurality of levels of application for the plurality of constructs, wherein the plurality of levels of application define a plurality of resolutions for projecting at least one shadow, such that the at least one shadow is applied to the plurality of constructs at one level of application;
(2) calculating a first angle above a horizontal plane above which the simulated light source will illuminate a selected one of the plurality of constructs at the one level of application;
(3) calculating a second angle above a horizontal plane below which the simulated light source will cease to illuminate the selected one of the plurality of constructs at the one level of application;
(4) storing the angles determined in steps (2) and (3) for the selected one of the plurality of constructs at the selected shading resolution in the database; and
(5) repeating steps (2), (3) and (4) for each of the plurality of constructs in the database, and for each of the plurality of levels of application.

17. The method as defined in claim 1 wherein the method further comprises the steps of:
(1) determining a shadow rendering resolution of the graphics rendering hardware; and
(2) rendering the at least one time based shadow for the plurality of constructs in accordance with the shadow rendering resolution to thereby enable shadow rendering of the database.

18. The method as defined in claim 1 wherein the method further comprises the step of defining a set path for the simulated light source within the three dimensional simulated environment.

19. The method as defined in claim 18 wherein the method further comprises the step of enabling the simulated light source to move at a constant rate along the set path and relative to the selected time base.

20. The method as defined in claim 18 wherein the method further comprises the step of calculating the first angle relative to a periodic time reference and the set path of the simulated light source.

21. The method as defined in claim 20 wherein the method further comprises the step of calculating the second angle relative to a time of day and the set path of the simulated light source.

22. The method as defined in claim 21 wherein the method further comprises the step of selecting a latitude for each of the plurality of constructs such that the first angle and the second angle are determined relative to the latitude that the simulation represents.

23. The method as defined in claim 22 wherein the method further comprises the step of selecting a time of year which the three dimensional simulated environment is to be simulating such that the first angle and the second angle are determined relative to the time of year that the simulation represents.

24. The method as defined in claim 18 wherein the method further comprises the step of enabling the simulated light source to move off the set path, thereby requiring a graphics engine to recalculate the first angle and the second angle for each of the plurality of constructs during run-time operation of the simulation.

25. The method as defined in claim 1 wherein the method further comprises the step of selecting the simulated light source as a source of light that is defined to move in accordance with a determinable path within the three dimensional simulated environment and when pre-processing the database such that shadows cast therefrom can be calculated in reference to the selected time base.

26. The method as defined in claim 1 wherein the method further comprises the step of generating the three dimensional simulated environment from what is characterized as a single-pass shadow rendering graphics engine, thereby enabling the three dimensional simulated environment to be rendered in real-time.

27. The method as defined in claim 1 wherein the method further comprises the step of operating the selected time base with reference to a periodic time reference such that movement of shadows can be determined in accordance therewith.

28. The method as defined in claim 1 wherein the method further comprises the step of selecting a same of level of application for the pre-processing of the database and the processing of the database.

29. The method as defined in claim 1 wherein the method further comprises the steps of:
(1) determining a time of day at which the simulation is currently executing relative to the selected time base to thereby determine a third angle between the simulated light source and each of the plurality of constructs;
(2) selecting a level of application for the database, to thereby enable the graphics hardware to render the at least one time based shadow at an appropriate resolution;
(3) comparing the first angle and the second angle to the third angle, to thereby determine an illumination status of the construct; and
(4) rendering the construct with appropriate illumination in accordance with the selected level of application.

30. The method as defined in claim 1 wherein the method further comprises the step of rendering the at least one time based shadow in the three dimensional simulated environment in run-time by executing step 3) wherein the database is processed at run-time to thereby dynamically render the at least one time based shadow.

31. The method as defined in claim 1 wherein the method further comprises the step of rendering a time based shadow penumbra relative to the at least one time based shadow, to thereby render a more realistic shadow effect.

32. The method as defined in claim 31 wherein the method further comprises the step of utilizing a position of the simulated light source to thereby account for change in resolution of the time based shadow penumbra.

33. The method as defined in claim 32 wherein the method further comprises the steps of:
(1) sharpening a resolution of the time based shadow penumbra when the simulated light source is positioned relative close to the plurality of constructs; and
(2) blurring a resolution of the time based shadow penumbra when the simulated light source is positioned relative far from the plurality of constructs.

* * * * *